June 3, 1958            M. GAUL            2,837,005
EXPANDING HELICAL COIL FOR A WOOD SCREW
Filed May 21, 1953
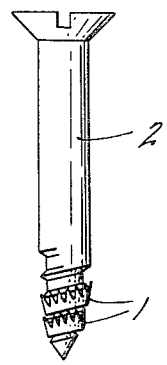
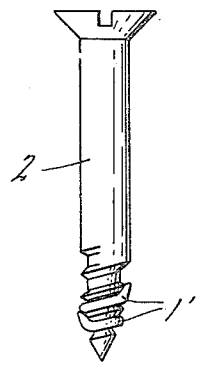
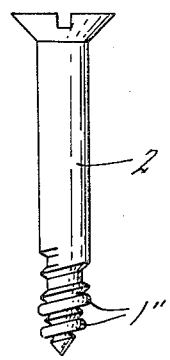
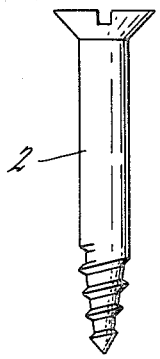
INVENTOR.
Max Gaul.
BY
Barnes, Dickey + Pierce.
ATTORNEYS.

United States Patent Office 2,837,005
Patented June 3, 1958

2,837,005

EXPANDING HELICAL COIL FOR A WOOD SCREW

Max Gaul, Eppstein, Taunus, Germany, assignor to Hans Sickinger, Providence, R. I.

Application May 21, 1953, Serial No. 356,378

Claims priority, application Germany December 20, 1952

1 Claim. (Cl. 85—2.4)

The present invention relates to a device which is used in conjunction with a wood screw to join, in as short a time as possible, parts consisting preferably of wood but also of any other material whose physical properties resemble those of wood.

Quick connectors of various designs have been known for some considerable time and have been used for the most different applications and materials. Nevertheless, there will be a continuous demand, particularly in the wide field of machine elements, for new designs of an enhanced usefulness, of which the present invention claims to be one embodiment. In contrast to the known designs, it is an object of the present invention to provide a rapid-joint screwing means which not only has the advantages of being particularly suited for the purposes specified above, but also possesses its simplicity of design, as well as quick applicability.

It is also an object to provide a connector which offers a firm and reliable seat in cross-grained wood, as compared to that of an ordinary wood screw.

Other objects, features, and advantages of the present invention will become apparent from the subsequent description, taken in conjunction with the accompanying drawings.

In the drawings:

Figure 1 is an elevational view of one embodiment of the invention using a notched steel strip;

Figure 2 is an elevational view of a modified form of the invention using a steel wire;

Figure 3 is an elevational view, of a third form of the invention, with the wire ends bent outward; and Figure 4 is an elevational view of a wood screw used in conjunction with the invention.

Referring to Figure 1, this represents one embodiment of the invention showing a locking element 1 and a wood screw 2 having a shortened threaded portion. The advantages of this type over an ordinary wood screw, which could also be employed, are obvious. Part 1 consists of a narrow steel strip which is slightly wider than the lead of the thread of the screw. The upper edge of the steel strip is deeply notched, the teeth being sharpened and bent slightly outwards. The steel strip is coiled, having for instance two turns, and rests with its lower edge against the threads which are covered by the points of the teeth. When part 1 is screwed onto the first thread having the smallest core diameter, its external diameter will slightly exceed the external thread diameter of the first thread, but will not exceed the shank diameter of the screw. The arrangement may, however, be so varied that the teeth will elastically fit into the corresponding notches in the thread while not exceeding the shank diameter of the screw. The latter requirement is of importance when using the device. The notches in the thread of the wood screw that are to receive the teeth can be easily manufactured by impressing the mounted locking element 1 into the soft iron.

Figure 2 shows another embodiment of the invention which is based, however, on the same fundamental idea. The locking element 1' consists here of steel wire instead of steel strip. The steel wire is fitted into the depth of two turns of thread of an ordinary wood screw 2, or one with a shortened threaded portion, in such a manner that the wire ends which are bent upwards in an axial sense to extend over the following turn of thread are situated on opposite sides of the screw. As with the tooth ends in the first variant of the invention, the wire ends are also bent slightly outwards and are sharpened, while slightly exceeding the diameter of the first threads.

The effect of the two embodiments hereinbefore described is the same. By way of preparation, a hole is bored into the wooden parts to be joined which slightly exceeds the length of the screw to be inserted and must be cylindrical down to the bottom, while its diameter corresponds nearly with that of the screw shank, being slightly narrower than the shank. The screw is then driven by strokes of a hammer into the bore until the screw head rests on the surface of the pieces to be joined. The teeth which are bent slightly outwards will lightly grip the hole. Subsequently, the screw is given a few turns with the aid of a screw driver, as a result of which the locking element 1 or 1', respectively, which was slightly compressed in an elastic manner by the hammer strokes due to the above-mentioned engagement between the teeth and the hole, will jam on the inner wall of the bore and get entirely stuck even where cross-grained wood is involved. The screwed joint may be loosened at any time without interfering with the quality of the joint. The locking element will now have a function similar to that of a nut. The strength of joint corresponds in general to that of a screw connection and will in some applications, as shown by the foregoing example, even surpass it in strength. The joint is quickly established in the manner described above and will result in considerable savings of cost and labor, particularly in mass production.

The third variant of the present invention, Figure 3, has been evolved on a principle differing slightly from that of the first two variants. The locking element 1" consists here of spring steel wire or soft iron wire which is coiled in a manner similar to the second variant, the sharpened ends of which are, however, not bent upwards but rather bent slightly outwards.

This variant is used with metal tubing in such a manner that the screw 2 which loosely carries the locking element 1" on the first few threads, is first driven by hammer into the tube of corresponding diameter whereby the element 1" is slightly compressed and forced into the groove of thread while at the same time pressing against the inner wall of the tube. On tightening the screw by screw driver, the element 1" is pushed forward on the conical core and may advance up to the shank while being elastically expanded and pressed with considerable force into the inner wall, thus effectively preventing any further twisting or displacement. The element 1" will now assume the part of a stationary nut from which the screw may at any time be unscrewed so as to be screwed in later. If, however, it is desired that not only the screw but also the element 1" be removed from the bore, the screw is first partially backed off without withdrawing it from the nut. It is then driven back by one stroke of a hammer into its former position. The locking element 1" is thereby forced out of its interference fit and moved onto a smaller core diameter, so that it will elastically shrink a little. Subsequently, the screw is again backed off by one turn, following which it may be extracted together with its element 1" by means of a plier.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In a screw fastener for work having a cylindrical bore, a wood screw having a tapered portion, a sharp thread of comparatively coarse pitch on said tapered portion with flats between adjacent turns, a helical steel strip mounted on said thread at a relatively narrow portion of said taper, the width of said strip being slightly greater than the lead of said thread, and a plurality of teeth along the edge of said strip facing the wider portion of said taper and spaced from each other in the direction of extent of said strip, said teeth being bent slightly outwardly, rotation of said screw causing said teeth to be fixed into the walls of said cylindrical bore at spaced points, whereby said strip becomes fixed to the work and thereafter acts as a nut.

References Cited in the file of this patent

UNITED STATES PATENTS

| | | |
|---|---|---|
| 1,199,624 | Smith | Sept. 26, 1916 |
| 1,966,520 | Bayner | July 17, 1934 |
| 2,099,450 | Meyer | Nov. 16, 1937 |
| 2,581,399 | Forster | Jan. 8, 1952 |

FOREIGN PATENTS

| | | |
|---|---|---|
| 273,780 | Great Britain | June 20, 1927 |
| 1,038,680 | France | May 13, 1953 |
| 748,338 | Great Britain | Apr. 25, 1956 |